Figure 1:
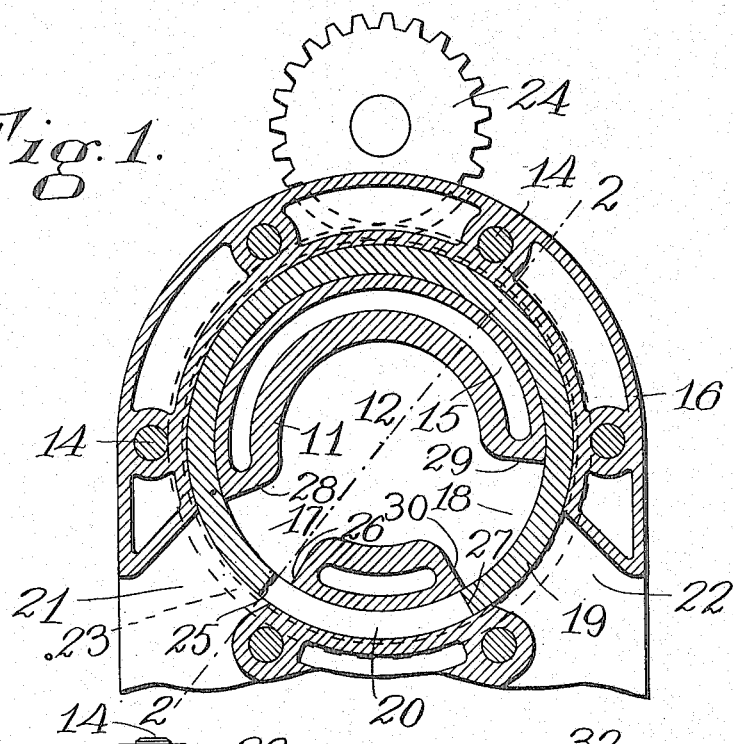

W. ARTER & B. E. DELLE.
VALVE MECHANISM.
APPLICATION FILED OCT. 20, 1911.

1,129,944.

Patented Mar. 2, 1915.

Witnesses
R. D. Tolman
H. M. Kennedy

Inventors
William Arter
Bernhard E. Delle
By Hartley W. Bartlett
Attorney

UNITED STATES PATENT OFFICE.

WILLIAM ARTER AND BERNHARD E. DELLE, OF WORCESTER, MASSACHUSETTS.

VALVE MECHANISM.

1,129,944.  Specification of Letters Patent.  Patented Mar. 2, 1915.

Application filed October 20, 1911. Serial No. 655,819.

*To all whom it may concern:*

Be it known that we, WILLIAM ARTER, a subject of the King of England, and BERNHARD E. DELLE, a citizen of the United States, residing at Worcester, in the county of Worcester, State of Massachusetts, have invented a certain new and useful Improvement in Valve Mechanism, of which the following is a specification, reference being had therein to the accompanying drawings.

This invention relates to valve mechanism for use in either steam or internal combustion engines, compressors or any engine or mechanism of a like nature and has for its object the production of an engine which is noiseless, and in which the timing is positive and never varying.

This construction can be used with an engine of one or more cylinders separate or in block and with either two or four cycle engines, or in any construction where it is necessary to introduce fluid into a chamber and exhaust the same therefrom.

For the sake of simplicity and clearness of description, the device will be treated in connection with one cylinder of a four cycle internal combustion engine but it should be clearly understood that the invention is in no way limited to use in such a construction.

One feature of the invention is the use of a revoluble sleeve acting relative to a stationary member concentric therewith each of which is preferably provided with a port or ports to permit the passage of fluid therethrough. In the preferred embodiment the stationary member is within the revoluble sleeve and forms the combustion chamber head. This stationary head is preferably provided with ports or openings opposite to external inlet and outlet pipes or passages and the rotating sleeve controls the communication between these external passages and their respective ports in the stationary head.

This invention permits of a construction having many advantages over the present types including, an easily removable cylinder head, a water jacket without pockets to interfere with the drainage thereof, timing of the valve which is positive and can never vary after once being set, the use of large inlet and outlet openings, easy packing and lubrication, reduction of number of moving parts and the easy application of spark plugs and relief cocks.

Numerous other advantages will be described hereinafter and included in the claims.

One embodiment of the invention is shown in the drawings in which:—

Figure 2:
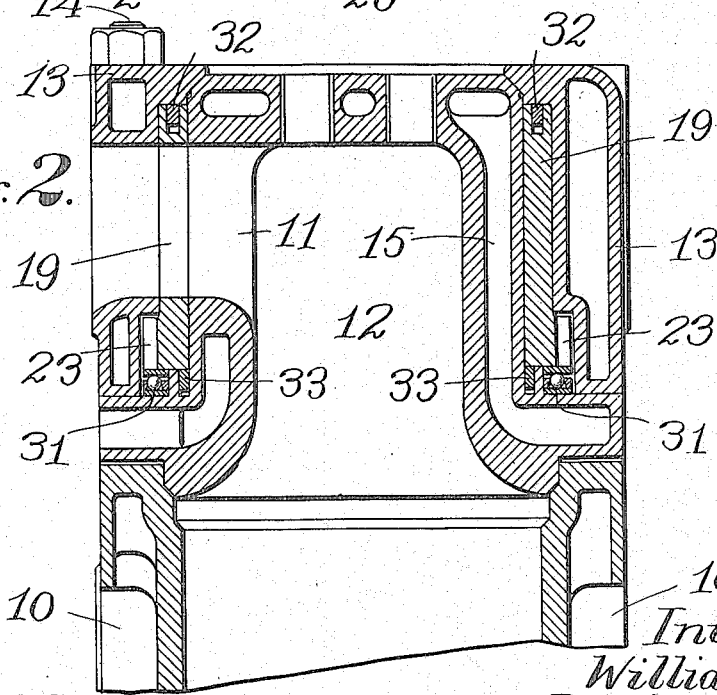

Figure 1 is a sectional plan of the invention applied to the cylinder of an internal combustion engine, as will be described fully hereinafter. Fig. 2, section on the line 2—2 of Fig. 1.

Referring to the drawings, the cylinder 10 has secured to one end thereof a combustion chamber head 11 within which is the combustion chamber 12, by means of the cover 13 which is provided with bolts 14 or other suitable fasteners. Within the walls of the combustion chamber head 11 is the usual water jacket 15 and portion 16 of the outer wall of this head 11 is preferably cylindrical. This combustion chamber head is provided with an inlet passage 17 and an outlet passage 18. Fitting about the cylindrical portion 16 of the combustion chamber head 11 and concentric therewith is a revoluble sleeve 19 which is provided with a port 20, best shown in Fig. 1 of the drawings. The cover 13 is provided with an intake passage 21 and an outlet passage 22 respectively opposite to the inlet opening 17 and the outlet opening 18 in the combustion chamber head. The port 20 in the revoluble sleeve 19 is adapted to communicate between these inlet openings 17 and 21 and also between the outlet passages 18 and 22.

Upon the outer wall of the revoluble sleeve 19 and either integral therewith or fastened thereto is a gear 23 which is adapted to be driven by a gear 24 preferably directly connected to the crank shaft of the engine. This gear 24 causes the revoluble sleeve 19 to rotate about the combustion chamber head 11 and to cause the port 20 to successively open communication between the inlet passages and between the outlet passages previously described. The sleeve 19 forms a revolving valve and on account of the method of drive produces a never varying timing device.

In describing the operation of the valve mechanism, we shall assume that the sleeve starts in the position shown in Fig. 1 and is rotated in the same direction as the hands of a clock. As soon as the edge 25 of the port 20 passes the edge 26 of the inlet passage in the combustion chamber head, the fluid will enter from the passage 21 and pass into the combustion chamber 12 and will continue to enter until the opposite edge 27 of the port 20 meets the edge 28 of the inlet passage, when the communication between these passages will be cut off and the compression of the gases within the cylinder will take place. The sleeve 19 continues to revolve and when the edge 25 passes the edge 29 of the outlet passage, the gases will be free to pass out of the outlet 22 and this exhaust will continue until the edge 27 of the sleeve meets the edge 30 which was taken as the initial position and the engine has therefor completed its cycle.

The revoluble sleeve 19 is preferably supported on a ball bearing 31. Packing members or rings 32 and 33 are preferably provided to prevent the escape of the gases past the revoluble sleeve 19.

In the foregoing specification, the construction has been described as provided with inlet and outlet ports but it should be clearly understood that the same port may act as both an inlet and an outlet port. Also that wherever the words ports, passages, or openings are used both in the specification and claims, these words should be read to include one or more such articles.

The applicants are aware that numerous changes can readily be made in the construction and arrangement of parts by anyone skilled in the art without departing from the scope of their invention and they do not care to be limited to the particular embodiment herein shown and described.

What we claim as our invention and desire to secure by Letters Patent is:—

1. In a device of the class described, a ported cylinder, a revoluble sleeve about said cylinder adapted to control the passage of fluid through the ports in said cylinder, a cover member adapted to retain said sleeve upon said cylinder, and a packing member seated in a slot in the upper edge of said sleeve and adapted to coact with said cover member.

2. In a device of the class described, a ported cylinder, a revoluble sleeve about said cylinder adapted to control the passage of fluid through the ports in said cylinder, a cover member adapted to retain said sleeve upon said cylinder, and a packing member contacting with the lower edge of said sleeve.

3. In a device of the class described, a ported cylinder, a revoluble cylindrical sleeve about said cylinder adapted to control the passage of fluid through the ports in said cylinder, a cover member adapted to retain said sleeve upon said cylinder, and packing rings contacting with said sleeve at both its upper and its lower edges.

In testimony whereof we affix our signatures, in the presence of two witnesses.

WILLIAM ARTER.
BERNHARD E. DELLE.

Witnesses:
HARTLEY W. BARTLETT,
FLORA E. RAY.